United States Patent
Bildner et al.

(12) 
(10) Patent No.: US 6,319,968 B1
(45) Date of Patent: Nov. 20, 2001

(54) ACOUSTICALLY EFFECTIVE BITUMINOUS MASS FOR HOT APPLICATION, METHOD FOR THE PRODUCTION THEREOF, AND BITUMINOUS SHEET MATERIAL MADE THEREFROM

(75) Inventors: Karlheinz Bildner, Linsengericht; Zdislaw Kornacki, Frankfurt, both of (DE)

(73) Assignee: CWW-Gerko Akustik GmbH & Co. KG, Frankfurt (DE)

( * ) Notice: Subject to any disclaimer, the term of this patent is extended or adjusted under 35 U.S.C. 154(b) by 0 days.

(21) Appl. No.: 09/311,593

(22) Filed: May 14, 1999

(30) Foreign Application Priority Data

May 14, 1998 (DE) .............................. 198 21 633

(51) Int. Cl.$^7$ ..................................... C08L 95/00
(52) U.S. Cl. ............................... 524/59; 524/68
(58) Field of Search ......................... 524/59, 68

(56) References Cited

U.S. PATENT DOCUMENTS

| 4,415,702 | * | 11/1983 | Ono et al. | 524/59 |
| 5,256,710 | * | 10/1993 | Krivohlavek | 524/59 |
| 5,430,070 | * | 7/1995 | Kono | 521/69 |

FOREIGN PATENT DOCUMENTS

| 1 770 690 | 5/1972 | (DE) . |
| 29 04 689 | 9/1980 | (DE) . |
| 29708419 U1 | 10/1997 | (DE) . |
| 196 20 800 A1 | 11/1997 | (DE) . |
| 44 23 479 A1 | 12/1997 | (DE) . |
| 0 617 098 A1 | 9/1994 | (EP) . |
| 07 70 646 A2 | 5/1997 | (EP) . |
| 0 808 877 A1 | 11/1997 | (EP) . |
| 1511604 | 4/1968 | (FR) . |
| 2 076 824 A | 12/1981 | (GB) . |
| 20542 | * 1/1987 | (JP) .................. 524/59 |

* cited by examiner

Primary Examiner—Peter Szekely
(74) Attorney, Agent, or Firm—Crowell & Moring LLP

(57) ABSTRACT

An acoustically effective, bituminous mass which can be applied hot by means of a flat extrusion mold contains an addition of a thermosetting resin or thermosetting reagent combination, plus bitumen, polymers and/or wax as well as fillers such as aluminum powder or zinc powder, powdered graphite or mica powder. This addition is added to the mass at temperatures under 125° C., so that the polymerization reaction does not occur until a subsequent heating.

19 Claims, 3 Drawing Sheets

ACOUSTICALLY EFFECTIVE BITUMINOUS MASS FOR HOT APPLICATION, METHOD FOR THE PRODUCTION THEREOF, AND BITUMINOUS SHEET MATERIAL MADE THEREFROM

BACKGROUND AND SUMMARY OF THE INVENTION

This invention relates to a method for the production of an acoustically effective bituminous mass for hot application. In particular, this invention relates to an anti-rumbling composition for motor vehicles, in which bitumen and other substances such as polymers, waxes and non-crosslinking adhesive resins are mixed together at temperatures of 100° C. to 200° C. to form a homogeneous mass. In another aspect, this invention relates to an acoustically effective, bituminous mass and a bituminous sheet material made by this method.

This application claims the priority of German application No. 198 21 633.5, filed May 14, 1998, the disclosure of which is expressly incorporated by reference herein.

Compositions of this kind are used especially in motor vehicles for coating body metal and serve for noise attenuation, rumble suppression and protection against corrosion. EP 0 617 098 is an example of the state of the art. Such masses are usually applied to the body sheet metal at temperatures of 100° C. to 160° C. by the airless or extrusion method under robot control, before the body metal is lacquered.

The conventional masses for hot application as well as the bitumen sheet materials behave like classical thermoplastics, so that high temperatures produced in the engine compartment by the engine heat or by solar irradiation may impair their sound damping properties and other physiological parameters such as hardness, fogging, and stiffness.

In recent times the requirement has developed that coatings for body sheet materials be able to exercise a stiffening effect in addition to their acoustical effectiveness. The reason for this lies in the need to save weight in automobile design which results in a striving to reduce the thickness of the sheet metal. Anti-rumble compositions on a bitumen base cannot satisfy this requirement because to produce a stiffening effect effective systems must be used which, by altering the molecular structure and molecular weight, produce certain properties in the mass.

High-melting resins have already been added to the bituminous mass to achieve greater hardness. But since motor vehicles often become very hot from the sun, and when such masses are used in the engine compartment the engine produces great heating of the anti-rumble mass, such compositions often become undesirably soft despite the addition of high-melting resins, causing them to lose their stiffening action entirely and even to run off.

This invention is addressed to the problem of developing a method for the preparation of an acoustically effective, bituminous mass, especially an anti-rumble mass for a motor vehicle, which will result in a composition with a high stiffening action without reducing its acoustical effectiveness, and which will retain its stiffening effect even at relatively high temperatures. Furthermore, this invention contemplates a bituminous mass and a bitumen sheet material made by the method.

Other than in the operating examples, or where otherwise indicated, all numbers expressing quantities of ingredients or reaction conditions used herein are to be understood as modified in all instances by the term "about".

The first problem is solved by the invention in that, after being mixed together at temperatures of 130° C. to 180° C., the mass is cooled to below 130° C. and a thermosetting resin or a thermosetting reagent combination is then added to it. By "thermosetting reagent combination" is meant a combination of ingredients which, when heated, will form a thermosetting reagent which then cures in situ. Hardening takes place under the influence of temperature by crosslinking and by chain extension. The thermosetting reagent leads to polycondensation with longer chains and higher relative molecular weight. The individual chains are crosslinked by bridges. A preferred thermosetting reagent combination comprises 3–25% alkyl phenolic resin, 2–5% magnesium oxide, and 0.2–1% resorcinol.

By this procedure, firstly a mass is formed which is sufficiently fluid for application to body sheet metal through wide slot molds by extrusion. It is not until after the motor vehicle has then been lacquered and the vehicle is exposed in the lacquer drying oven for about half an hour to temperatures from about 160° C. to 200° C. that the polyreaction of the added substances occurs and the mass is thus cured. Presumably the crosslinking resin forms in the bituminous mass a foam-like lattice which binds the bituminous mass. The mass therefore remains solid after the polyreaction (crosslinking) even at high temperatures, so that it retains its stiffening action regardless of the temperatures.

The polycondensation of alkyl phenolic resins in the bituminous medium has not heretofore been known from the literature and from the experience of the experts. Measurements have shown that, in a mass prepared by the method of the invention, the loss factor at the high temperatures that prevail in the engine compartment of a motor vehicle is substantially higher than in a comparable bituminous mass without the addition of a crosslinking resin or of a thermosetting combination of reagents. Therefore a mass made by the method is very especially suitable as an anti-rumble substance in the engine compartment and roof area of motor vehicles.

The cooling of the mass before adding the thermosetting resin can be performed simply by adding other components of the formula.

The method of the invention is also suitable for the production of bitumen sheet materials by calendering the mass to a sheet material after the addition of the thermosetting resin or thermosetting combination of reagents. Such acoustically effective bitumen sheet materials can be of one or more layers and serve especially as anti-rumble coatings in motor vehicles, and can be self-adhesive, fusion-adhesive or magnetically adhesive according to how they are installed in the motor vehicle. It is also possible to provide such sheet materials with coverings, such as metal foils, for example.

The second problem referred to, namely the creation of a bituminous mass and of a bitumen sheet material by the method, is solved by the invention by an addition of a thermosetting resin or a crosslinking combination of reagents.

Such a mass is easily applied with heating and after the poly-reaction and crosslinking it has a high stiffening effect without impairment of its acoustical effectiveness. This effectiveness at temperatures such as occur in the engine compartment and roof area will be made substantially greater by the additive according to the invention than in a bituminous mass without the additive. The advantage of the mass according to the invention in comparison to the former bituminous compositions is that after curing it has a dry surface and is not tacky, and that no substances are outgassed from them to result in fogging.

The mass according to the invention can be applied to the body sheet metal by means of flat extrusion molds. Yet it is also possible for the mass to serve as a starting material for an acoustically effective bitumen sheet to be applied to sheet metal. The stiffening effect is then achieved by adhering the sheet to the body metal. Here the advantage is that the sheet is easy to shape before its polycondensation in the lacquer drying oven, and therefore can easily conform to the shape and the recesses of the metal. Also conceivable, however, are sandwich systems such as magnetic sheets, for example, with stiffened bitumen sheet materials or magnetic sheets duplexed to aluminum foil.

The mass of the invention has in the cured state the following physical and mechanical properties:

Heat resistance: up to 215° C./30 min (overhead and perpendicular)

Hardness: 85–98 Shore

Flexural strength (EN 63): 28–36 kN/cm$^2$ (at 3 mm flexure)

Elasticity modulus (EN 65): 160–10 Gpa (at 3 mm flexure)

The resins known by the trademarks Alresen PA 101, Alresen PA 321 and Alresen PA 341 (from Vianova Resins GmbH of Wiesbaden, Germany) have proven to be advantageous as alkyl phenolic resins. These alkylphenolresols are para tert-butylphenol resols with various molecular weights and containing various amounts of reactive methylol and methylene ether groups. These groups produce the crosslinking, but at the same time lead to good surface adhesion. Alresen PA 101 has a very low molecular weight, while Alresen PA 341 has a somewhat higher molecular weight.

To be fully effective, the Alresen resins must be reacted with metal oxides. Good results have been obtained with magnesium oxide. The resorcinol likewise serving as an additive is very active in the electrophilic substitution. It reacts with methylene groups beginning even at 60° C. and regulates the degree of crosslinking and thus the hardness of the mass, the flexural strength, the elasticity modulus, the thermal stability and the acoustical properties of the mass.

The thermosetting resin could also be a novolak type alkyl phenolic resin cured by the addition of melamine resin or hexamethylenetetramine.

Optionally, blocked polyisocyanates can be included in the mass. Such compounds are stable up to a certain temperature. When heated to that temperature the blocking groups are cleaved, leaving unprotected reactive groups which can react immediately with a polyol to form a polyurethane.

Other objects, advantages and novel features of the present invention will become apparent from the following detailed description of the invention when considered in conjunction with the accompanying drawings.

DESCRIPTION OF THE PREFERRED EMBODIMENTS

Figure 1:
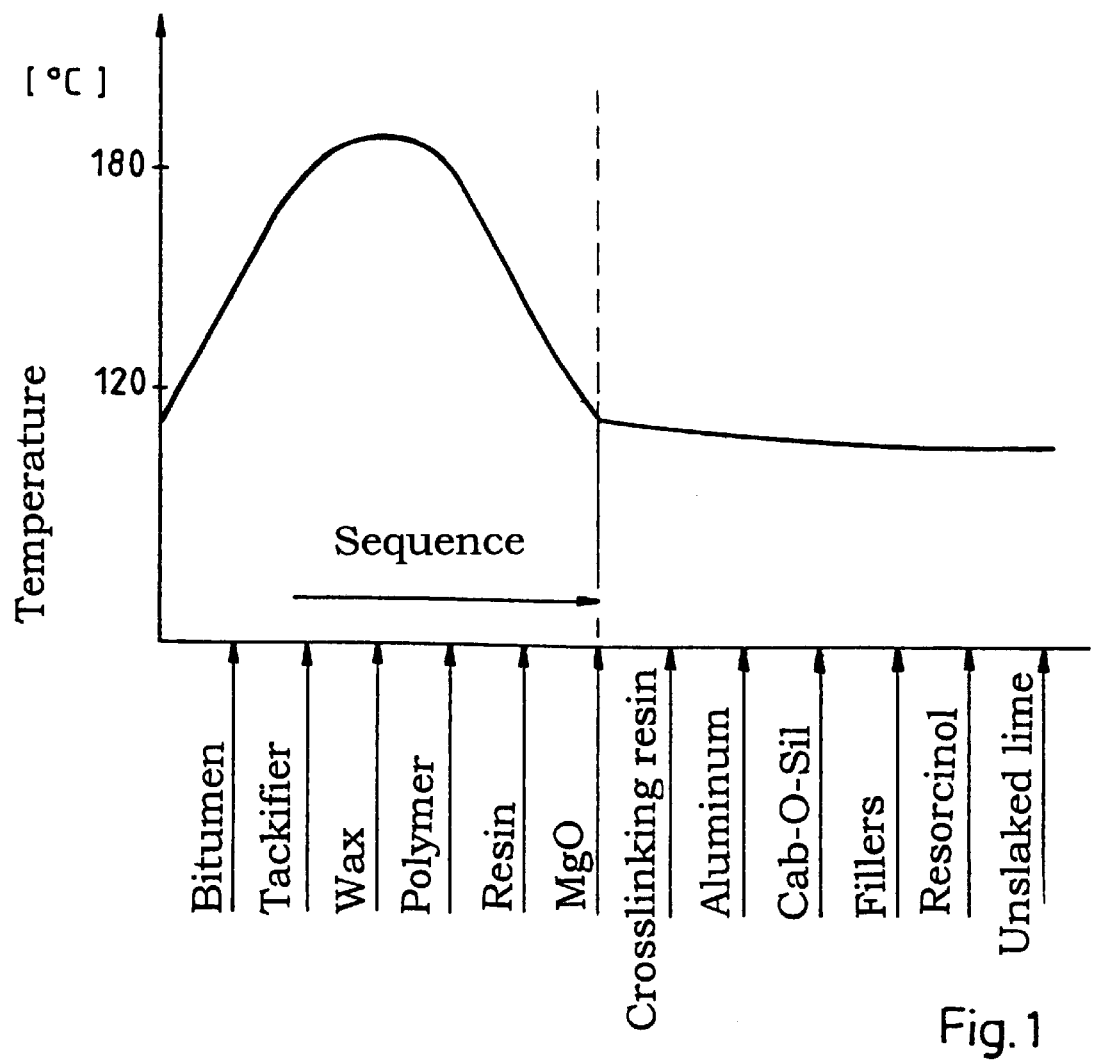
FIG. 1 shows the temperature curve of the mass during the addition of its individual components.

An anti-rumble mass according to the present invention comprises the following composition:

| Ingredient | Percentage (w/w) |
| --- | --- |
| Bitumen | 35–80 |
| Tackifier | 0.5–2 |
| Polymers | 1–4 |
| Wax | 2–6 |
| Unreactive resin | 0–3 |
| Alkyl phenolic resin | 3–25 |
| Magnesium oxide | 2–5 |
| Resorcinol | 0.2–1 |
| Thixotropic adjuvant | 2–6 |
| Aluminum paste | 1–4 |
| Fillers | 15–30 |
| Unslaked lime | 3–6 |

For the particular use as an anti-rumble mass, the following formula has proven to be especially advantageous. In this mixture of various polymers, resins and waxes the polarity of the reaction medium is optimally adapted to the desired reaction. Furthermore, in this mass controllable parameters of its physical and mechanical properties are obtained.

| Ingredient | Percentage (w/w) |
| --- | --- |
| Bitumen B 180 | 42.0 |
| Centroplast tackifier | 1.5% |
| Polymers | 1.3% |
| Wax | 5.0% |
| Unreactive resin | 1.5% |
| Reactive resin | 8.5% |
| Magnesium oxide | 2.0% |
| Resorcinol | 0.5% |
| Aluminum paste | 2.0% |
| Fillers: | |
| Hollow spheres of microsilicate | 14.0% |
| Mica | 10.0% |
| Chalk | 2.7% |
| Unslaked lime | 5.0% |

Bitumen B 180 is a mixture of mostly aliphatic hydrocarbons having a penetration of 180 ($\frac{1}{10}$ mm), measured at 25° C.

The aluminum paste is a mixture of aluminum powder and an inert carrier such as mineral oil, with the proportions not being critical. Generally, there should be enough mineral oil for the mixture to be workable. The specific aluminum paste used by us contains 65% aluminum powder in process oil SR 130 from Nynes.

Centroplast is formylated aliphatic polyurethane.

The polymer in the above formulation can be ethylenevinyl acetate copolymers, for example, Ecolene from Exxon; copolymers of vinyl esters such as vinyl acetate, for example, Vinnapas B500/20VL from Wacker Chemie GmbH; SBS rubber, for example, Koramelt 603 from Kömmerling Chemische Fabrik GmbH, Kraton D 1184 from Shell, or Finaprene Mix from Fina; amorphous poly-α-olefins, for example, APAO-Rextac from Huntsman; or copolymers of α-olefins, for example, various polymers sold under the trademark Vertoplast by Huntsman.

Suitable unreactive resins are hydrocarbon resins, for example, Alresin PK 500 from Vianova Gmbh; hydrated hydrocarbon resins, for example, Hercules MBG 264 from Hercules BV; hydrated colophony resin, for example, Staybelite Resin E from Hercules BV; non-reactive phenol resins, for example, Novolacke from Vianova GmbH; and epoxy resins, for example, Beckopox EP 301, from Vianova GmbH.

The nature of the alkyl phenolic resin and the weight ratio to the magnesium oxide and resorcinol determine the degree of stiffening of the mass and affect acoustic effectiveness, thermal behavior, adhesion, viscosity and flow parameters, and the mechanical properties. The unslaked lime in the mass binds the water formed by the polycondensation.

The mass has especially advantageous properties if formylated aliphatic polyurethane is provided as the tackifier, 1–4% of polyvinyl acetate copolymer (PVA) is used as the polymer, and hydrated hydrocarbon resin is provided as the nonreactive resin.

Fillers may also be included in the mass. Such fillers could be, for example, hollow spheres of microsilicate, mica, chalk, aluminum powder, zinc powder, powdered graphite, or powdered limestone.

FIG. 1 shows that the bituminous mass is first mixed together at temperatures up to about 180° C. Then follows cooling to 110 to 120° C., but at least to 125° C. Only then is the thermosetting resin added, along with the magnesium oxide, the resorcinol and other additives.

Figure 2:
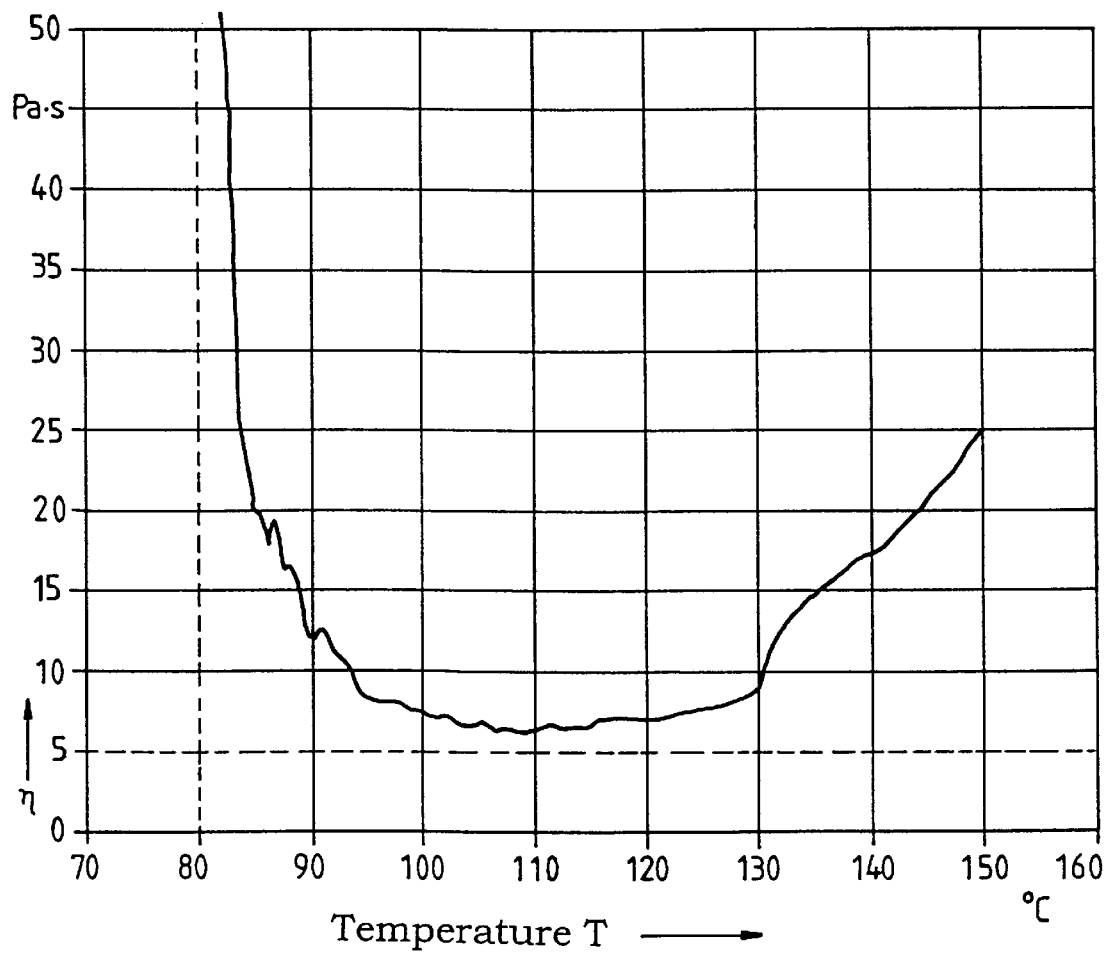
FIG. 2 shows the viscosity of the mass of the invention in relation to temperature.

FIG. 2 shows that in the mass according to the invention the viscosity initially decreases greatly at temperatures above 89° C., but at 130° C. it increases relatively steeply because then the crosslinking of the reactive resin begins. This stiffening produced by polycondensation and crosslinking is also retained during subsequent cooling.

Figure 3:
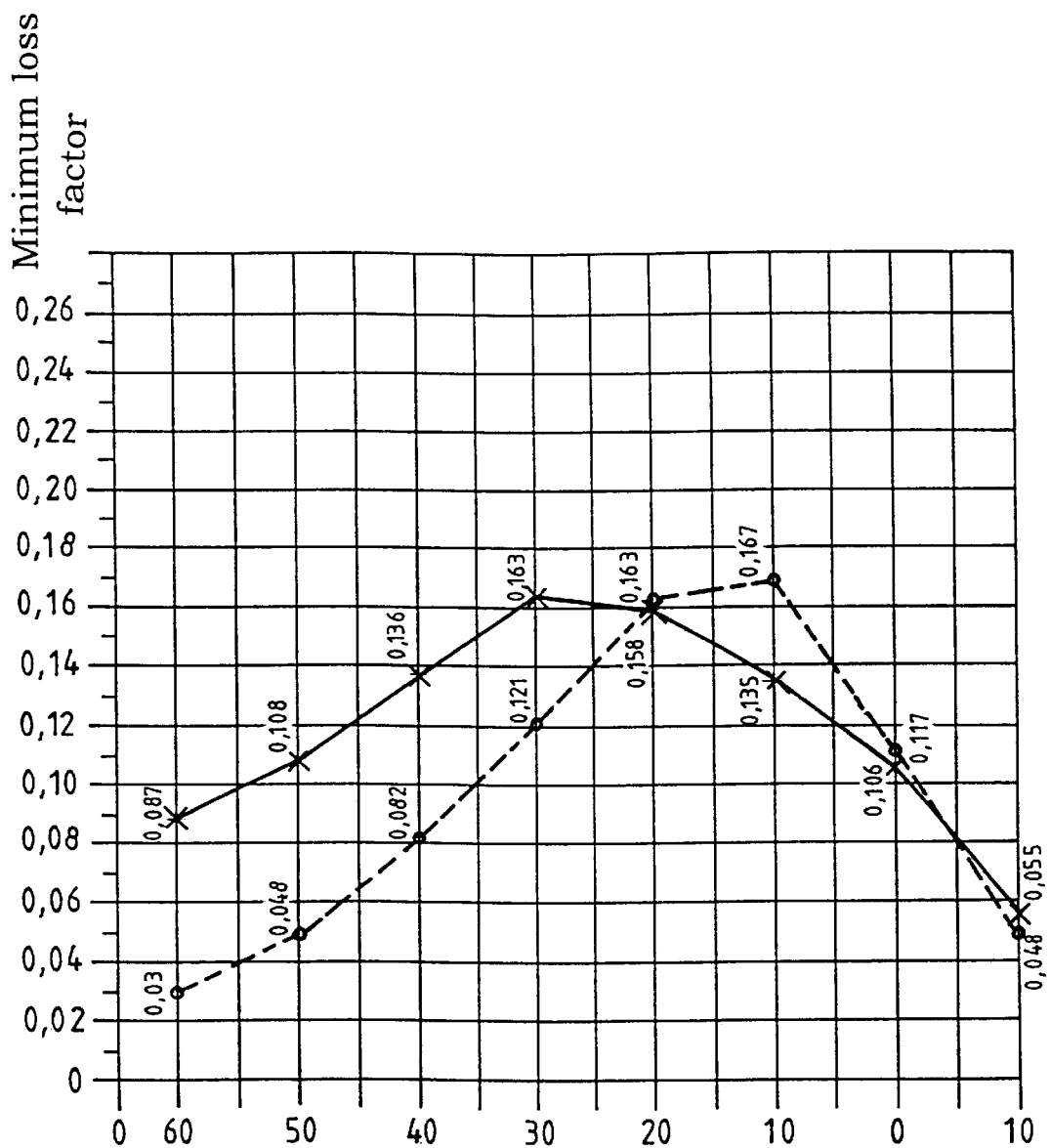
FIG. 3 shows the loss factor per DIN 53440 of the mass of the invention in comparison to a conventional mass without the addition of polymerized resin.

In the diagram of FIG. 3 it is to be noted that, due to the addition of the crosslinkable resin according to the invention, the loss factors are substantially higher at higher temperatures than in the case of a conventional bituminous mass. The anti-rumble effect has also shifted as a whole to higher temperatures.

It should be apparent from the foregoing detailed description that the objects set forth at the outset to the specification have been successfully achieved. Moreover, while there is shown and described present preferred embodiments of the invention, it is to be distinctly understood that the invention is not limited thereto but may be otherwise variously embodied and practiced within the scope of the following claims.

What is claimed is:

1. A method for the production of a sound deadening bituminous mass for hot application, comprising mixing a composition comprising bitumen at temperatures of 130° C. to 180° C. to form a homogeneous mass, cooling the mass to below 130° C., and then adding a thermosetting resin or a thermosetting combination of reagents thereto.

2. A method for the production of a sound deadening bituminous mass for hot application, comprising mixing a composition which comprises bitumen and at least one member of the group consisting of tackifiers, thermoplastic polymers, waxes and unreactive resins at temperatures of 130° C. to 180° C. to form a homogeneous mass, cooling the mass to below 130° C., and then adding a thermosetting resin or a thermosetting combination of reagents thereto.

3. Method according to claim 2, wherein the cooling is performed by adding additional formula components.

4. Method according to claim 2, further comprising calendering said cooled mass after the addition of the thermosetting resin or thermosetting reagent combination to form a sheet material.

5. Method according to claim 3, further comprising calendering said cooled mass after the addition of the thermosetting resin or thermosetting reagent combination to form a sheet material.

6. A sound deadening bituminous mass for hot application which consists essentially of (A) bitumen, (B) at least one member selected from the group consisting of tackifiers, thermoplastic polymers, waxes and unreactive resins, and (C) a thermosetting resin or a thermosetting reagent combination, wherein said thermosetting reagent combination comprises 3–25% alkyl phenolic resin, 2–5% magnesium oxide, and 0.2–1% resorcinol.

7. A sound deadening bituminous mass for hot application which consists essentially of (A) bitumen, (B) at least one member selected from the group consisting of tackifiers, thermoplastic polymers, waxes and unreactive resins, and (C) a thermosetting resin or a thermosetting reagent combination, wherein said mass further comprises blocked polyisocyanate.

8. A sound deadening bituminous mass for hot application which consists essentially of (A) bitumen, (B) at least one member selected from the group consisting of tackifiers, thermoplastic polymers, waxes and unreactive resins, and (C) a thermosetting resin or a thermosetting reagent combination, wherein the tackifier is formulated, aliphatic polyurethane.

9. A sound deadening bituminous mass for hot application which consists essentially of (A) bitumen, (B) at least one member selected from the group consisting of tackifiers, thermoplastic polymers, waxes and unreactive resins, and (C) a thermosetting resin or a thermosetting reagent combination, wherein the non-reactive resin comprises hydrated hydrocarbon resin.

10. A sound deadening bitumen sheet comprising an acoustically effective bituminous mass as defined in claims 6, 7, 8 or 9.

11. The invention defined in claim 6, 7, 8 or 9, wherein said thermosetting resin comprises a novolak alkyl phenolic resin cured by the addition of melamine resin or hexamethylenetetramine.

12. The invention defined in claim 6, 7, 8 or 9, wherein said thermosetting resin comprises at least one epoxy resin in combination with at least one non-self hardening phenolic resin.

13. The invention defined in claim 6, 7, 8 or 9, wherein the polymer is 1–4% polyvinyl acetate copolymer.

14. A sound deadening bituminous mass for hot application which consists essentially of:
Bitumen 35–80%
Tackifier 0.5–2%
Thermoplastic polymers 1–4%
Wax 2–6%
Unreactive resin 0–3%
Alkyl phenolic resin 3–25%
Magnesium oxide 2–5%
Resorcinol 0.2–1%
Thixotropic adjuvant 2–6%
Aluminum paste 1–4%
Fillers 15–30%
Unslaked lime 3–6%.

15. The invention defined in claim 14, wherein said filler is chalk or powdered limestone.

16. The invention defined in claim 14, wherein said mass consists essentially of:
Bitumen 42.0%
Tackifier 1.5%
Thermoplastic polymers 1.3%
Wax 5.0%
Nonreactive resin 1.5%
Thermosetting resin 8.5%
Magnesium oxide 2.0%
Resorcinol 0.5%
Aluminum paste 2.0%

Fillers:
   Silicate microspheres 14.0%
   Mica 10.0%
   Chalk 2.7%
Unslaked lime 5.0%.

17. A sound deadening bitumen sheet comprising an acoustically effective bituminous mass consisting essentially of:
Bitumen 35–80%
Tackifier 0.5–2%
Thermoplastic polymers 1–4%
Wax 2–6%
Unreactive resin 0–3%
Alkyl phenolic resin 3–25%
Magnesium oxide 2–5%
Resorcinol 0.2–1%
Thixotropic adjuvant 2–6%
Aluminum paste 1–4%
Fillers 15–30%
Unslaked lime 3–6%.

18. The invention defined in claim 17, wherein said filler is chalk or powdered limestone.

19. The invention defined in claim 17, wherein said mass consists essentially of:
Bitumen 42.0%
Tackifier 1.5%
Thermoplastic polymers 1.3%
Wax 5.0%
Nonreactive resin 1.5%
Thermosetting resin 8.5%
Magnesium oxide 2.0%
Resorcinol 0.5%
Aluminum paste 2.0%
Fillers:
   Silicate microspheres 14.0%
   Mica 10.0%
   Chalk 2.7%
Unslaked lime 5.0%.

\* \* \* \* \*